(12) United States Patent
Rho et al.

(10) Patent No.: US 8,208,095 B2
(45) Date of Patent: Jun. 26, 2012

(54) DISPLAY SUBSTRATE AND METHOD FOR MANUFACTURING THE SAME

(75) Inventors: Soon-Joon Rho, Suwon-si (KR); Hee-Keun Lee, Suwon-si (KR); Baek-Kyun Jeon, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 442 days.

(21) Appl. No.: 12/428,817

(22) Filed: Apr. 23, 2009

(65) Prior Publication Data

US 2010/0128205 A1 May 27, 2010

(30) Foreign Application Priority Data

Nov. 27, 2008 (KR) ................ 2008-118709

(51) Int. Cl.
*G02F 1/1333* (2006.01)
*G02F 1/13* (2006.01)
*G02B 5/30* (2006.01)

(52) U.S. Cl. .............. 349/96; 349/92; 349/187

(58) Field of Classification Search ............ 349/92, 349/96, 123, 187
See application file for complete search history.

(56) References Cited

U.S. PATENT DOCUMENTS

| 7,148,942 B2 * | 12/2006 | Kobayashi et al. ......... 349/122 |
| 7,220,371 B2 * | 5/2007 | Suganuma ................ 264/1.31 |
| 2004/0142183 A1 * | 7/2004 | Lazarev et al. ............ 428/426 |
| 2006/0121185 A1 * | 6/2006 | Xu et al. ................. 427/163.1 |
| 2008/0143638 A1 * | 6/2008 | Kim et al. ................... 345/6 |

FOREIGN PATENT DOCUMENTS

| JP | 2007-183524 | 7/2007 |
| KR | 1020070001656 | 1/2007 |
| KR | 1020080001504 | 1/2008 |

* cited by examiner

*Primary Examiner* — Eric Wong
(74) *Attorney, Agent, or Firm* — F. Chau & Associates, LLC

(57) ABSTRACT

A display substrate includes a base substrate, a polarizing layer formed on the base substrate and including a polarizing pattern having a plurality of carbon nano-tubes arranged in a direction, and a pixel layer formed on the base substrate and including a plurality of pixel units.

12 Claims, 7 Drawing Sheets

DISPLAY SUBSTRATE AND METHOD FOR MANUFACTURING THE SAME

CROSS REFERENCE TO RELATED APPLICATION

This application claims priority to Korean Patent Application No. 2008-0118709, filed on Nov. 27, 2008, the contents of which are herein incorporated by reference in their entirety.

BACKGROUND OF THE INVENTION

1. Technical Field

The present disclosure relates to a display substrate and a method for manufacturing the display substrate, and more particularly, to a display substrate used in a liquid crystal display device and a method for manufacturing the display substrate.

2. Discussion of the Related Art

A liquid crystal display (LCD) device displays an image using a liquid crystal layer as a light shutter. The liquid crystal layer transmits linearly polarized light therethrough.

A backlight assembly, which is disposed behind an LCD panel of the LCD device, provides the LCD panel with randomly polarized light. The LCD panel includes a polarizing plate disposed on an outer surface of the LCD panel. The polarizing plate changes the randomly polarized light into the linearly polarized light. However, the polarizing plate absorbs light provided from the backlight assembly. As such, light efficiency of the LCD device decreases.

A wire grid pattern having a line width and a pitch of several hundreds nanometers may be used instead of the conventional polarizing plate.

However, when the wire grid pattern is formed via a photolithography process using a photomask or a nano imprinting, the wire grid pattern may have a low precision. For example, when the wire grid pattern is applied to a medium-sized or large-sized display device, such as a large-sized television, or a large-sized monitor to decrease the thickness of the display device, it is difficult to precisely form the wire grid pattern on the medium or large-sized display device. Further, the photolithography process using the photomask or the nano imprinting is an expensive process.

SUMMARY OF THE INVENTION

Exemplary embodiments of the present invention provide a display substrate with a reduced thickness and improved polarization.

According to an exemplary embodiment of the present invention, a display substrate includes a base substrate, a polarizing layer and a pixel layer. The polarizing layer can be formed on the base substrate. The polarizing layer may include a polarizing pattern having a plurality of carbon nano-tubes arranged in a direction. The pixel layer can be formed on the base substrate. The pixel layer may include a plurality of pixel units.

The pixel layer may be formed on the polarizing layer. The polarizing layer can be formed on a first surface of the base substrate and the pixel layer can be formed on a second surface opposite to the first surface of the base substrate.

The display substrate may further include a protective layer. The protective layer may be formed on the polarizing pattern. The protective layer may cover the whole of the base substrate including the polarizing pattern.

The polarizing layer may include a self assembled monolayer formed between the polarizing patterns adjacent to each other.

The display substrate may further include a color layer which is formed between the base substrate and the polarizing layer. The color layer may include a light-emitting body which absorbs light to represent a color, and the color layer can be formed under the polarizing layer.

According to an exemplary embodiment of the present invention, a method for manufacturing a display substrate is provided. A plurality of carbon nano-tubes can be blade-coated on a base substrate to form a polarizing layer including a polarizing pattern. A pixel layer can be formed on the base substrate. The pixel layer may include a plurality of pixel units.

In forming the polarizing layer, a self assembled monolayer may be formed on a non-polarizing region of the base substrate, a water layer may be formed on a polarizing region of the substrate, and the polarizing pattern may be formed on the water layer.

In forming the polarizing pattern, an electric field or a magnetic field may be provided with the base substrate in a blade-coating direction.

In an exemplary embodiment, each of the carbon nano-tubes may be treated by a hydrophilic treatment to have a hydrophilic characteristic.

According to an exemplary embodiment of the present invention, a polarizing pattern may be formed using carbon nano-tubes on the display substrate which has a wide area in a large-sized or medium-sized display device. Thus, thickness of the large-sized or medium-sized display device may be decreased and reliability in polarizing the light may be improved.

BRIEF DESCRIPTION OF THE DRAWINGS

Exemplary embodiments of the present invention can be understood in more detail from the following descriptions taken in conjunction with the accompanying drawings in which.

DETAILED DESCRIPTION OF EXEMPLARY EMBODIMENTS

The present invention is described more fully hereinafter with reference to the accompanying drawings, in which exemplary embodiments of the present invention are shown. The present invention may, however, be embodied in many different forms and should not be construed as limited to the exemplary embodiments set forth herein.

It will be understood that when an element or layer is referred to as being "on," "connected to" or "coupled to" another element or layer, it can be directly on, connected or coupled to the other element or layer or intervening elements or layers may be present.

Figure 1:
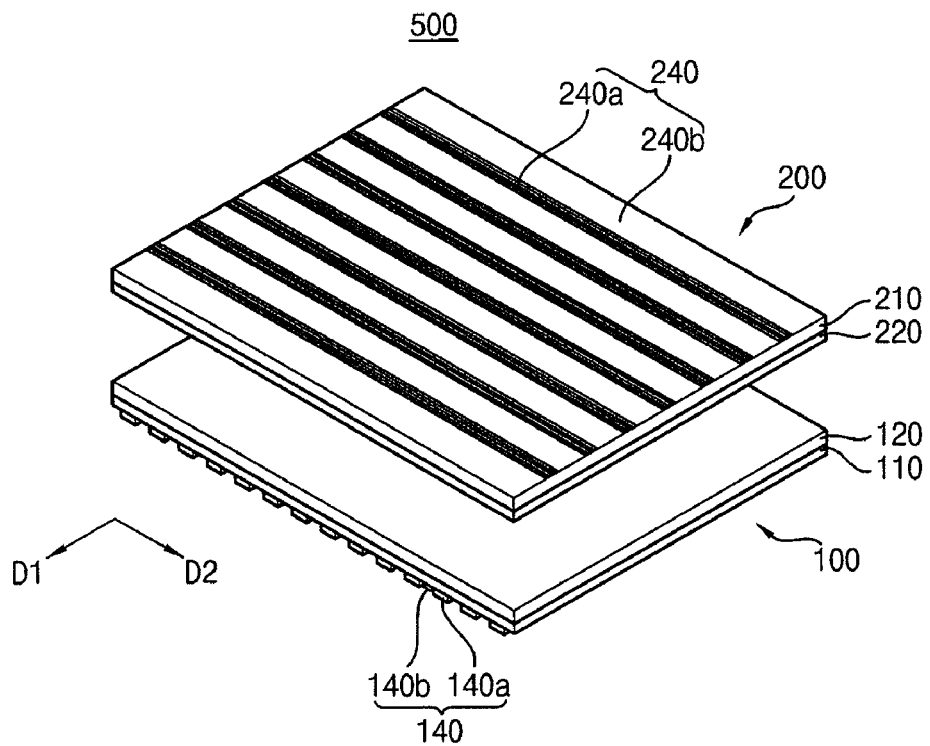
FIG. 1 is a perspective view illustrating a display panel according to an exemplary embodiment of the present invention.

FIG. 1 is a perspective view illustrating a display panel according to an exemplary embodiment of the present invention.

Figure 2:
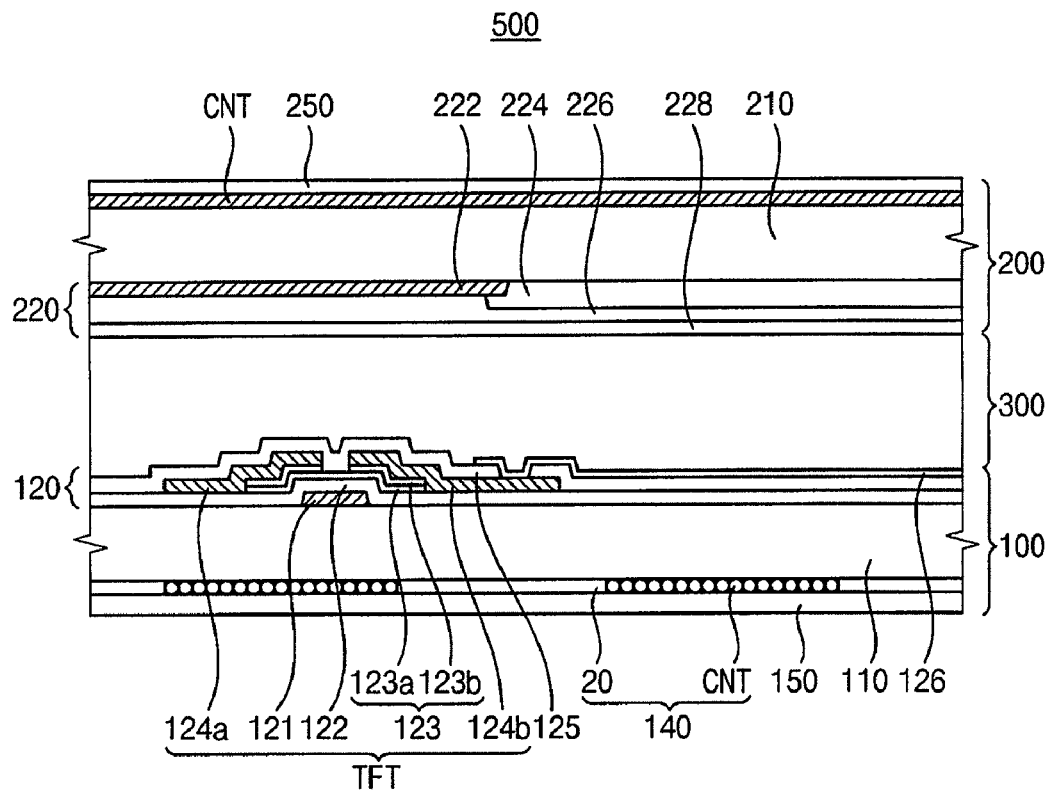
FIG. 2 is a cross-sectional view illustrating a display panel according to an exemplary embodiment of the present invention.

Referring to FIGS. 1 and 2, a display panel 500 may include a first display substrate 100, a second display substrate 200 opposite to the first display substrate 100, and a liquid crystal layer 300 disposed between the first and second display substrates 100 and 200.

The first display substrate 100 includes a first pixel layer 120 and a first polarizing layer 140. The first pixel layer 120 may be formed on a first surface of a first base substrate 110. The first polarizing layer 140 may be formed on a second surface opposite to the first surface of the first base substrate 110. Alternatively, the first polarizing layer 140 may be formed on the first surface.

The first base substrate 110 may be a glass substrate.

The first polarizing layer 140 includes a first polarizing pattern 140a and a first non-polarizing pattern 140b.

The first polarizing pattern 140a may extend in a first direction D1 of the display panel 500. A plurality of the first polarizing patterns 140a may be arranged in a second direction D2. The second direction D2 may be perpendicular to the first direction D1. Alternatively, the second direction D2 may form an acute angle with the first direction D1. The first polarizing pattern 140a may be, for example, a stripe type. The first polarizing pattern 140a may partially reflect or absorb light which reaches the first polarizing layer 140. The first polarizing pattern 140a may include a plurality of carbon nano-tubes.

The first non-polarizing pattern 140b may extend in the first direction D1. A plurality of the first non-polarizing patterns 140b may be arranged in the second direction D2. Each of the first non-polarizing patterns 140b may be disposed between the first polarizing patterns 140a adjacent to each other. The first non-polarizing pattern 140b may be, for example, the stripe type. The first non-polarizing pattern 140b may partially transmit the light which reaches the first polarizing layer 140.

In an exemplary embodiment, the first polarizing pattern 140a may partially absorb or reflect the light and the first non-polarizing pattern 140b may partially transmit the light. Thus, the first polarizing layer 140 may polarize the light that reaches the first polarizing layer 140.

The second display substrate 200 includes a second pixel layer 220 and a second polarizing layer 240. The second pixel layer 220 may be formed on a third surface of a second base substrate 210, and the second polarizing layer 240 may be formed on a fourth surface opposite to the third surface of the second base substrate 210. Alternatively, the second polarizing layer 240 may be formed on the third surface of the second base substrate 210.

The second base substrate 210 may be a glass substrate.

The second polarizing layer 240 includes a second polarizing pattern 240a and a second non-polarizing pattern 240b. The second polarizing pattern 240a may cross the first polarizing pattern 140a. In an exemplary embodiment, the second polarizing pattern 240a may be disposed in parallel with the first polarizing pattern 140a.

The second polarizing pattern 240a may extend in the second direction D2 of the display panel 500. A plurality of the second polarizing patterns 240a may be arranged in the first direction D1. The second polarizing pattern 240a may be, for example, the stripe type. The second polarizing pattern 240a may include a plurality of carbon nano-tubes.

The second non-polarizing pattern 240b may extend in the second direction D2. A plurality of the second non-polarizing patterns 240b may be arranged in the first direction D1. Each of the second non-polarizing patterns 140a may be disposed between the second polarizing patterns 240a adjacent to each other. The second non-polarizing pattern 240b may be, for example, the stripe type.

FIG. 2 is a cross-sectional view illustrating a display panel according to an exemplary embodiment of the present invention.

Referring to FIG. 2, the first pixel layer 120 may include a plurality of pixel units. The first display substrate 100 may include a first protective layer 150 formed on the first polarizing layer 140.

Each of the pixel units of the first pixel layer 120 includes a switching element TFT connected to signal lines and a pixel electrode 126. The first pixel layer 120 may include a gate insulating layer 122 and a protective insulating layer 125. The signal lines may include a gate line and a date line crossing the gate line.

In an exemplary embodiment, the switching element TFT may be electrically connected to the gate line and the date line. The switching element TFT may include a gate electrode 121 electrically connected to the gate line, a source electrode 124a electrically connected to the data line, a drain electrode 124b spaced apart from the source electrode 124a, and an active pattern 123. The active pattern 123 may include a semi-conductive layer 123a and an ohmic contact layer 123b. The semi-conductive layer 123a may be formed on the gate insulating layer 122. The ohmic contact layer 123b may be formed on the semi-conductive layer 123a.

The pixel electrode 126 is electrically connected to the switching element TFT. The pixel electrode 126 may be formed on the protective insulating layer 125. The pixel electrode 126 may contact the drain electrode 124b through a contact hole which exposes a portion of the drain electrode 124b.

The first polarizing pattern 140a of the first polarizing layer 140 includes a carbon nano-tube CNT.

The carbon nano-tube CNT may comprise carbon. The carbon nano-tube CNT may be a pipe type material of a nanosize. The nanosize may be in the range between about 1 nanometer (nm) to about 100 nm. The carbon nano-tube CNT may have a conductive characteristic. The carbon nano-tube CNT may have a hydrophobic characteristic. The carbon nano-tube CNT may block the transmittance of light. The first polarizing pattern 140a may be formed by arranging the carbon nano-tube CNT, for example, in the first direction D1.

The first non-polarizing pattern 140b of the first polarizing layer 140 may include a self assembled monolayer 20. The self assembled monolayer 20 may be formed between the first polarizing patterns 140a adjacent to each other, to define the first non-polarizing pattern 140b.

The self assembled monolayer 20 may include a substrate combining portion combined with the first base substrate 110, and a hydrophobic portion connected to the substrate combining portion. The substrate combining portion may be combined with a surface of the first base substrate 110. The hydrophobic portion may be formed on the substrate combining portion to face the surface of the first base substrate 110. The surface of the first substrate 110 may have a hydrophilic characteristic when the first substrate 110 is the glass substrate. In an exemplary embodiment, by forming the self assembled monolayer 20, the characteristic of a region including the self assembled monolayer 20 in the first substrate 110 may be changed from hydrophilic to hydrophobic.

The first protective layer 150 may be formed on the first base substrate 110 including the first polarizing layer 140 to cover the whole first base substrate 110. The first protective layer 150 may prevent the carbon nano-tubes CNT of the first polarizing pattern 140a from being detached from the first base substrate 110. The first protective layer 150 may be formed using, for example, thermoplastics.

The second pixel layer 220 may include a plurality of pixel units. The second display substrate 200 may further include a second protective layer 250 on the second polarizing layer 240.

Each of the pixel units in the second pixel layer 220 may include a common electrode 228. The second pixel layer 220 may be formed on the second base substrate 210. The second pixel layer 220 may include a light-blocking pattern 222, a color filter 223 and an over-coating layer 226.

The second polarizing layer 240 includes the second polarizing pattern 240a and the second non-polarizing pattern 240b.

The second polarizing pattern 240a is substantially the same as the first polarizing pattern 140a, except that the second polarizing pattern 240a and the second non-polarizing pattern 240b are formed on the second substrate 210.

A method for manufacturing the first display substrate 100 according to an exemplary embodiment of the present invention is described in connection with FIGS. 3A, 3B, 4A, 4B, 5A, 5B and 6. In a blade-coating process according to an exemplary embodiment, coating material is dropped on a substrate and a blade pushes the coating material while moving over the substrate to coat the coating material on the entire substrate.

Figure 3A:
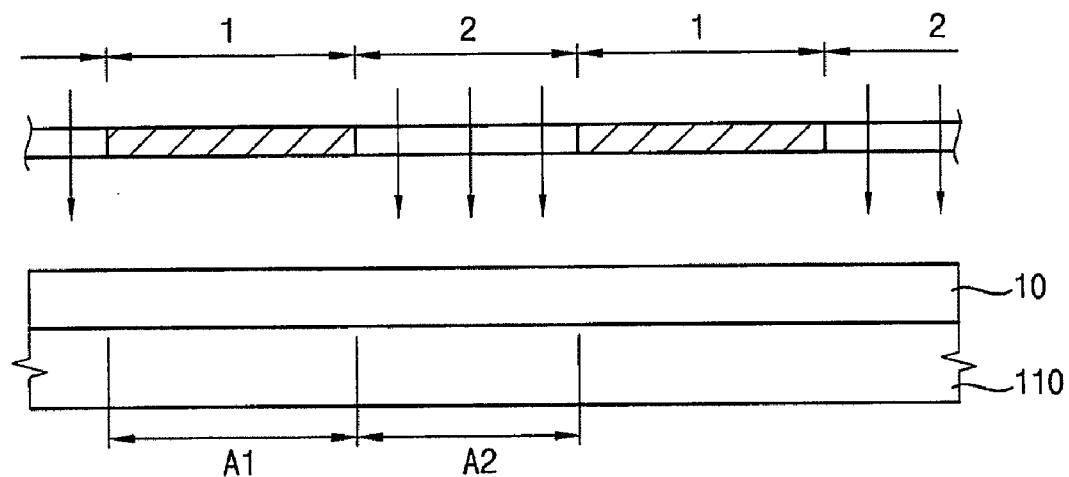
FIGS. 3A, 3B, 4A, 4B, 5A, 5B, and 6 show parts in a method of forming a first display substrate according to an exemplary embodiment of the present invention.
Figure 3B:
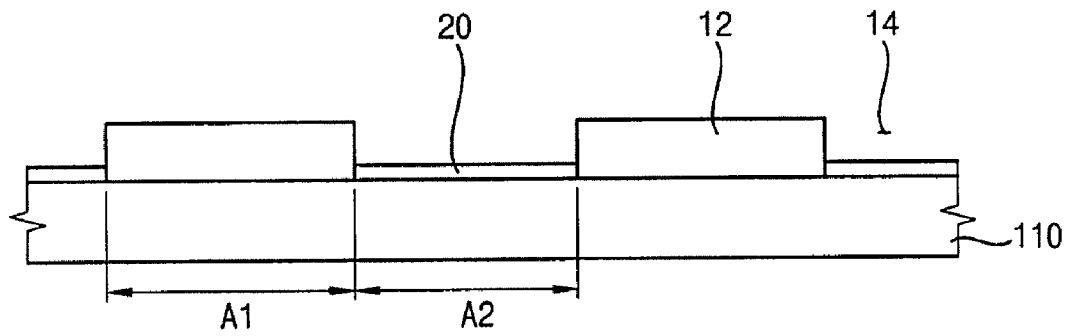

FIGS. 3A and 3B show a method of forming a self assembled monolayer according to an exemplary embodiment of the present invention.

Referring to FIG. 3A, a photoresist layer 10 is formed on the first base substrate 110. The photoresist layer 10 may be formed using, for example, a positive type photoresist composition. The positive type photoresist composition in an irradiated region is removed by a developing solution applied to the irradiated region. Thus, the positive type photoresist in a non-irradiated region remains on the first base substrate 110.

A mask may be disposed over the first base substrate 110 including the photoresist layer 10. The mask may include a light-blocking portion 1 and a light-transmitting portion 2. Light may be projected from the top of the mask to the photoresist layer 10. The light-blocking portion 1 may be disposed corresponding to a polarizing region A1 in the first base substrate 110. The light-transmitting portion 2 may be disposed corresponding to a non-polarizing region A2 in the first base substrate 110.

Referring to FIG. 3B, after projecting the light, the photoresist layer 10 is developed to form a photo pattern 12 on the first base substrate 110.

The photoresist layer 10 on the polarizing region A1 may not be removed by the developing solution and remain on the first base substrate 110, and the photo pattern 12 may be formed on the first base substrate 110. The photoresist layer 10 on the non-polarizing region A2 may be removed by the developing solution to form an opening 14 which exposes the non-polarizing region A2. The photo pattern 12 may have the stripe type extending in a direction of the major axis of the first base substrate 110.

Then, the self assembled monolayer 20 is formed in the non-polarizing region A2 exposed by the opening 14.

The self assembled monolayer 20 may comprise a transparent material which transmits the light. The transparent material may include, for example, silicon compound including the substrate combining portion and the hydrophobic portion connected to the substrate combining portion. The substrate combining portion may include, for example, ethoxysilane or methoxysilane. The hydrophobic portion may include, for example, carbon chain.

The first base substrate 110 including the photo pattern 12 may be dipped in a solution including the silicon compound. The silicon compound may be combined with a surface of the non-polarizing region A2 of the first base substrate 110 to form the self assembled monolayer 20 on the non-polarizing region A2. The self assembled monolayer 20 may also be formed on the photo pattern 12.

The self assembled monolayer 20 is formed on the non-polarizing region A2. Thus, the non-polarizing region A2 may have the hydrophobic characteristic. By forming the self assembled monolayer 20, the first polarizing pattern 240a may not be formed on the non-polarizing region A2 in a following process. Thus, the first non-polarizing pattern 240b is formed on the non-polarizing region A2 which is defined by forming the first polarizing pattern 240a.

Figure 4A:
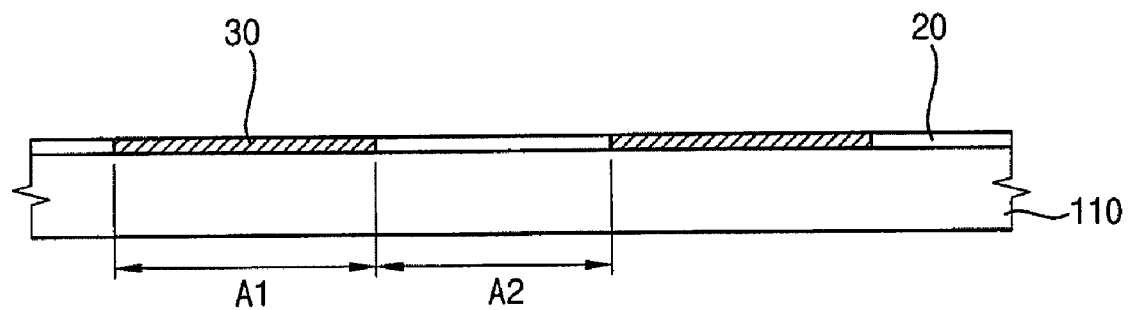
Figure 4B:
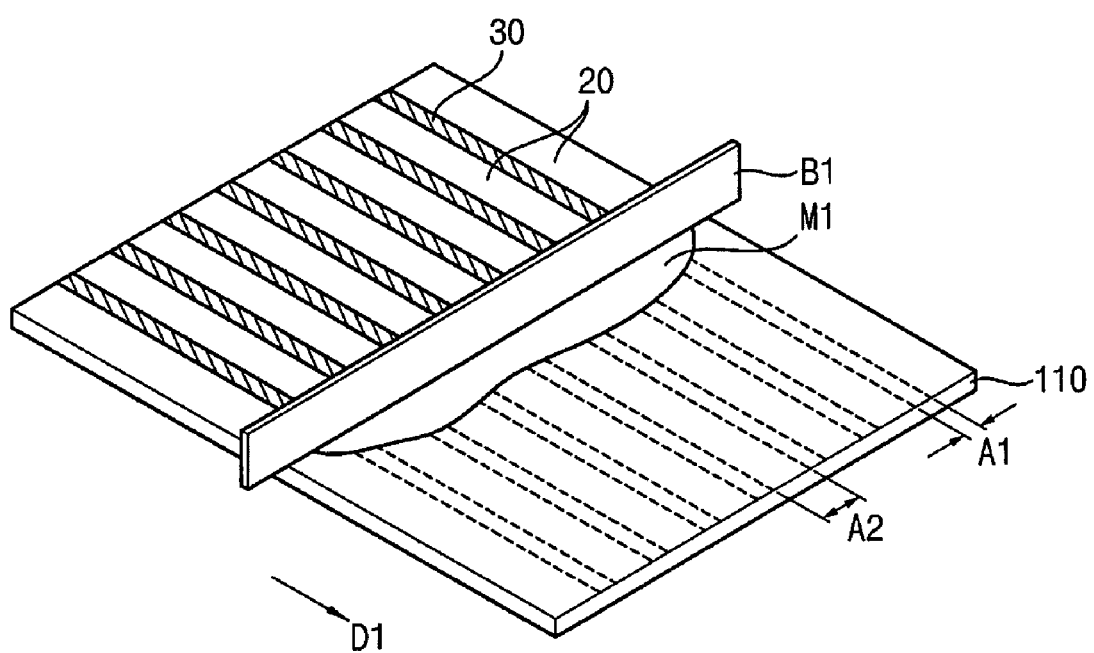
Figure 5A:
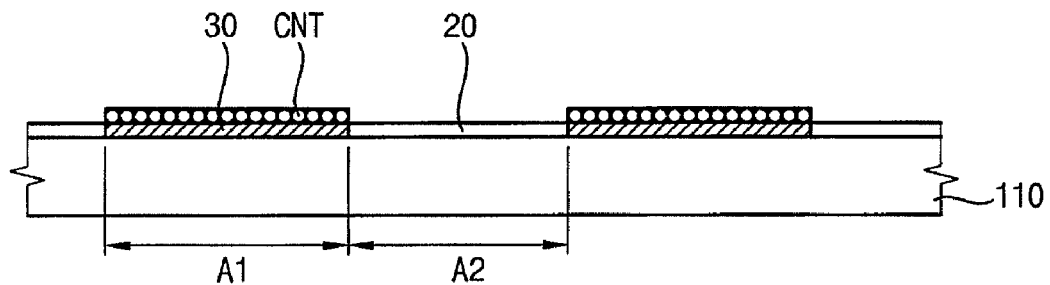
Figure 5B:
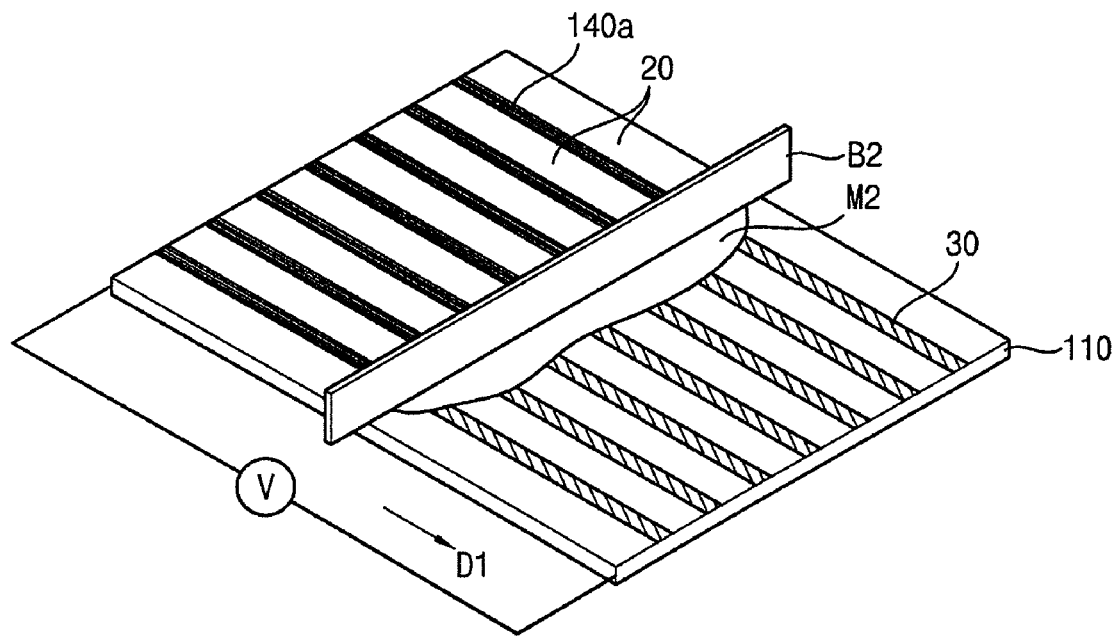

FIGS. 4A and 4B show a method of forming a water layer according to an exemplary embodiment of the present invention. FIGS. 5A and 5B show a method of forming a carbon nanotube according to an exemplary embodiment of the present invention.

Referring to FIGS. 3B, 4A, and 4B, the photo pattern 12 may be removed using a stripper from the first base substrate 110 including the self assembled monolayer 20 and the photo pattern 12. Thus, the self assembled monolayer 20 may only remain on the non-polarizing region A2. The first base substrate 110 of the polarizing region A1 may be exposed by removing the photo pattern 12.

Then, a water layer 30 may be formed on the polarizing region A1. The water layer 30 may include water ($H_2O$). For example, a deionized water M1 may be used to form the water layer 30.

Prior to forming the water layer 30, a surface of the polarizing region A1 may be treated via a hydrophilic treatment using oxygen gas ($O_2$) according to an exemplary embodiment of the present invention. When the surface is treated by the oxygen gas, materials which pollute the polarizing region A1 may be removed from the polarizing region A1. As such, the hydrophilic characteristic of the polarizing region A1 may be improved.

Referring to FIGS. 1 and 4B, the deionized water M1 may be dropped on an edge portion of the first base substrate 110 including the self assembled monolayer 20. The deionized water M1 is blade-coated using a first blade B1. A blade-coating direction may be substantially the same direction as the direction along which the first polarizing pattern 140a extends. For example, the blade-coating direction may be the first direction D1. The water layer 30 may be formed along the movement of the first blade B1.

The water layer 30 may be formed only in a hydrophilic region of the first base substrate 110. Since the self assembled monolayer 20 has the hydrophobic characteristic, the water layer 30 may not be formed on the first base substrate 110 of the non-polarizing region A2 when the deionized water M1 is blade-coated on the whole first base substrate 110. Thus, the water layer 30 may be selectively formed in the polarizing region A1.

Referring to FIGS. 5A and 5B, a carbon nano-tube CNT may be disposed on the first base substrate 110 including the water layer 30 to form the first polarizing pattern 140a in the polarizing region A1.

A carbon nano-tube dispersing solution M2 which includes the carbon nano-tubes CNT may be dropped on the first substrate 110 including the water layer 30. The carbon nano-tube dispersion solution M2 can be blade-coated by a second blade B2 to be disposed on the water layer 30. The carbon nano-tubes CNT which are disposed on the first base substrate 110 may be arranged in the first direction D1 using, for example, the second blade B2.

The carbon nano-tubes CNT may have the conductive characteristic. In forming the carbon nano-tubes CNT, a plurality of carbon nano-tubes having a semi-conductive characteristic may be formed with the carbon nano-tubes CNT having the conductive characteristic. The carbon nano-tubes CNT having the conductive characteristic may be separated from the carbon nano-tubes having the semi-conductive characteristic via, for example, an electrophoresis method, or a density gradient centrifugation method. Thus, the carbon nano-tubes CNT having the conductive characteristic may be selectively used in forming the first polarizing layer 140.

The carbon nano-tube dispersing solution M2 may include, for example, 1,4-dichlorobutane as a solvent. The solvent may not dissolve the carbon nano-tubes and interfere an attractive force between the carbon nano-tubes CNT to disperse the carbon nano-tubes CNT in the carbon nano-tubes dispersing solution M2.

The carbon nano-tubes CNT can be formed using carbon. Thus, the carbon nano-tubes CNT may have a hydrophobic characteristic. Thus, the carbon nano-tubes CNT may be treated via a hydrophilic treatment to be disposed on the water layer 30.

In an exemplary embodiment, the hydrophilic treatment may be performed using a solution which includes 1-chloroethyltrichlorosilane of about 1 volume percent (vol %) and a mixing solution being mixed with hexadecane and chloroform. In an exemplary embodiment, hexadecane and chloroform are mixed with the ratio of about 4 to 1. The carbon nano-tubes CNT may be dropped in the solution. After maintaining the carbon nano-tubes CNT dropped into the solution for about 3 hours, the carbon nano-tubes CNT may be rinsed by a chloroform within a dry nitrogen gas to generate the hydrophilic characteristic.

Accordingly, when the carbon-nano tubes CNT are blade-coated, the carbon nano-tubes CNT may be selectively arranged in the polarizing region A1 in which the water layer 30 is formed. When the carbon nano tubes dispersing solution M2 is blade-coated by the second blade B2 in the first direction D1, the carbon nano tubes CNT may be arranged in the first direction D1 along the movement of the second blade B2. When the carbon nano-tubes CNT are bladed coated, a thickness of the carbon nano-tubes CNT may be decreased, and the carbon nano-tubes may be a single layer.

When the carbon nano-tubes CNT are arranged in a direction without the blade-coating process to form the polarizing pattern, at least two layers of the carbon nano-tubes CNT may be unevenly formed on the water layer 30. Thus, the uneven layers of the carbon nano-tubes may cause a density of the polarizing pattern to be inconsistent from one location to another location, so that the polarizing characteristic of the polarizing pattern may be deteriorated.

The second blade B2 may move in the first direction D1 pushing the carbon nano-tube dispersing solution M2. The carbon nano-tubes CNT may be substantially formed on the water layer 30.

When the carbon nano-tubes dispersing solution M2 is blade coated using the second blade B2, an electric and/or magnetic field may be formed in the first base substrate 110 along the first direction. Since the carbon nano-tubes CNT have the conductive characteristic, the carbon nano-tubes CNT may be arranged in the direction substantially the same as that of the electric and/or magnetic field.

Accordingly, the first polarizing pattern 140a may be formed using the second blade B2 with the electric and/or magnetic field. Thus, the carbon nano-tubes CNT may be formed in a single layer and be arranged in the first direction D1 according to an exemplary embodiment of the present invention.

Figure 6:
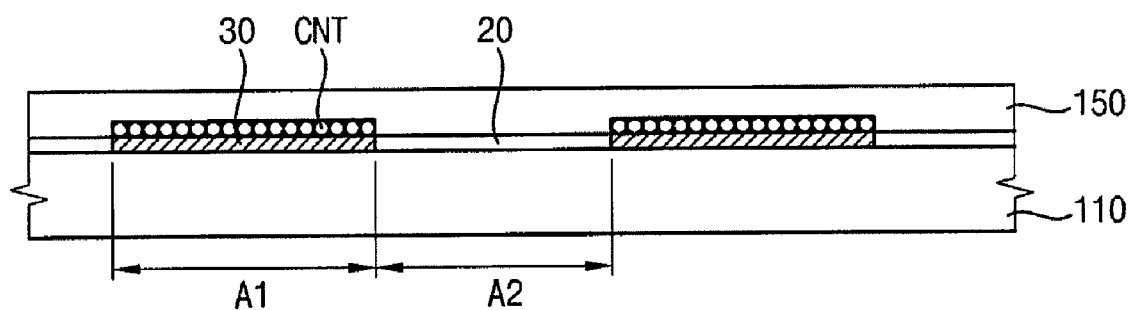

FIG. 6 is a cross-sectional view showing a protective layer according to an exemplary embodiment of the present invention.

Referring to FIGS. 5B and 6, the first protective layer 150 may be formed on the first base substrate 110 including the first polarizing pattern 140a.

The first protective layer 150 may cover the whole first base substrate 110 including the first polarizing patter 140a. The first protective layer 150 may prevent the first polarizing pattern 140a from being detached from the polarizing region A1. The first protective layer 150 may planarize the surface of the first base substrate 110.

In an exemplary embodiment, a thermoplastic may be dropped on the first base substrate 110 including the first polarizing pattern 140a and the thermoplastic may be spin-coated or slit-coated so that the first protective layer 150 may be uniformly formed on the whole first base substrate 110.

Figure 7:
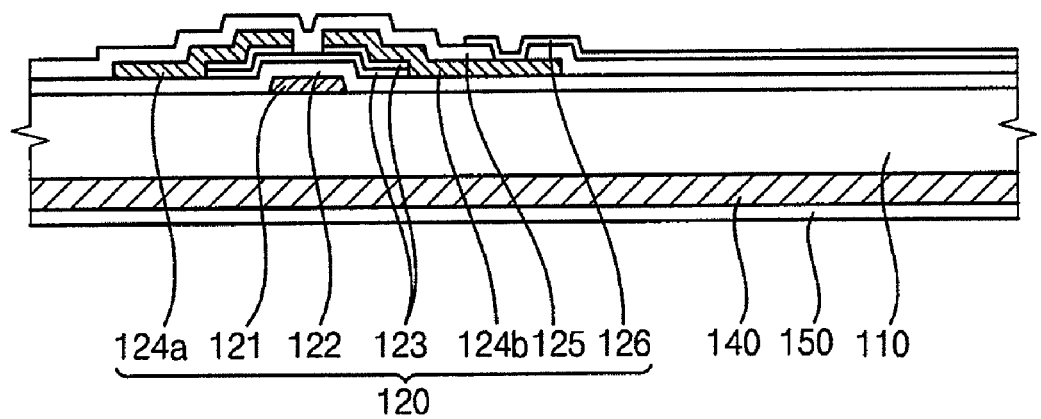
FIG. 7 is a cross-sectional view illustrating a first display substrate according to an exemplary embodiment of the present invention.

FIG. 7 is a cross-sectional view illustrating a first display substrate according to an exemplary embodiment of the present invention.

Referring to FIG. 7, a gate metal layer may be formed on a surface opposite to the surface of the first base substrate 110 on which the first polarizing layer 140 and the first protective layer 150 are formed. The gate metal layer may be patterned via, for example, a photolithography process to form a gate pattern including the gate line and the gate electrode 121.

The gate insulating layer 122 may be formed on the first base substrate 110 including the gate pattern. The active pattern 123 may be formed on the gate insulating layer 122. The gate insulating layer 122 may be formed using, for example, silicon oxide, or silicon nitride. The semi-conductive layer 123a of the active pattern 123 may be formed using, for example, amorphous silicon, and the ohmic contact layer 123b may be formed using, for example, amorphous silicon through which n$^+$ impurities are implanted at a high concentration (n+ a-Si).

Then, a data metal layer may be formed on the first base substrate 110 including the active pattern 123. The data metal layer may be patterned via a photolithography process to form a data pattern including the data line, the source electrode 124a, and the drain electrode 124b.

The protective insulating layer 125 may be formed on the first base substrate 110 including the data pattern. The protective insulating layer 125 corresponding to the drain electrode 124b may be partially removed to form the contact hole. The protective insulating layer 125 may be formed using, for example, silicon oxide, or silicon nitride.

Then, a transparent conductive layer may be formed on the protective insulating layer 125 including the contact hole. The transparent conductive layer may be patterned via a photolithography process to form the pixel electrode 126. The transparent conductive layer may be formed using, for example, indium zinc oxide (IZO), or indium tin oxide (ITO).

The first polarizing layer 140 may be directly formed on the first base substrate 110. Thus, a thickness of the display panel 500 may be decreased. The first polarizing pattern 140a may be formed using the carbon nano-tubes CNT. Since the carbon nano-tubes CNT are formed by the blade-coating, the first polarizing layer 140 may be formed on the first display substrate 110 used in a large-sized or medium-sized display panel.

A method of forming the second polarizing layer and forming the second protective layer according to an exemplary embodiment of the present invention are substantially the same as a method of forming the first polarizing layer and forming the first protective layer described in connection with FIGS. 1 through 6.

Referring to FIGS. 1 and 2, the second polarizing layer 240 and the second protective layer 250 are formed on a surface of the second base substrate 210.

The second pixel layer 220 may be formed on a surface opposite to the surface of the second base substrate 210 on which the second polarizing layer 240 and the second protective layer 250 are formed.

The light-blocking pattern 222 may be formed on the second base substrate 210. The light-blocking pattern 222 may be formed via, for example, sputtering chromium (Cr).

The color filter 224 may be formed on the second base substrate 210 including the light-blocking pattern 222. A color photoresist layer may be patterned via, for example, a photolithography process to form the color filter 224 according to an exemplary embodiment of the present invention.

Alternatively, the color filter 224 may be formed using a light-emitting body. The light-emitting body may absorb the backlight which is provided from the bottom of the display panel 500 to emit the energy. Thus, the light-emitting body may display a color based on the energy. The light-emitting body may include, for example, europium-activated barium magnesium aluminate ($BaMgAl_{10}O_{17}$:Eu) displaying a blue color, zinc sulfide (ZnS) displaying a green color, or silver-activated zinc cadmium sulfide (ZnCdS:AgCl) displaying a red color. The backlight may be generated by, for example, an ultra violet light-emitting diode (LED).

The over-coating layer 226 may be formed on the second base substrate 210 including the light-blocking pattern 222 and the color filter 224. The over-coating layer 226 may be formed using, for example, acrylic resin.

The common electrode 228 may be formed on the second base substrate 210 including the over-coating layer 226. The common electrode 228 may be formed using, for example, ITO, or IZO.

In an exemplary embodiment, the display panel includes the first polarizing layer 140 and the first pixel layer 120 formed on a different surface with each other. In an exemplary embodiment, the first polarizing layer 140 and the first pixel layer 120 may be formed on the same surface. The first polarizing layer 140 may be formed on the first pixel layer 120 or the first pixel layer 120 may be formed on the first polarizing layer 140 according to an exemplary embodiment of the present invention. When the first polarizing layer 140 is formed on the first pixel layer 120, a first planarizing layer may be formed on the first pixel layer 120 to planarize the first substrate 100, and the first polarizing layer 140 may be formed on the first planarizing layer.

The second pixel layer 220 may be formed on the second polarizing layer 240. The second polarizing layer 240 may be formed on the second pixel layer 220. When the second polarizing layer 240 is formed on the second pixel layer 220, a second planarizing layer may be formed on the second pixel layer 220 and the second polarizing layer 240 may be formed on the second planarizing layer.

Figure 8:
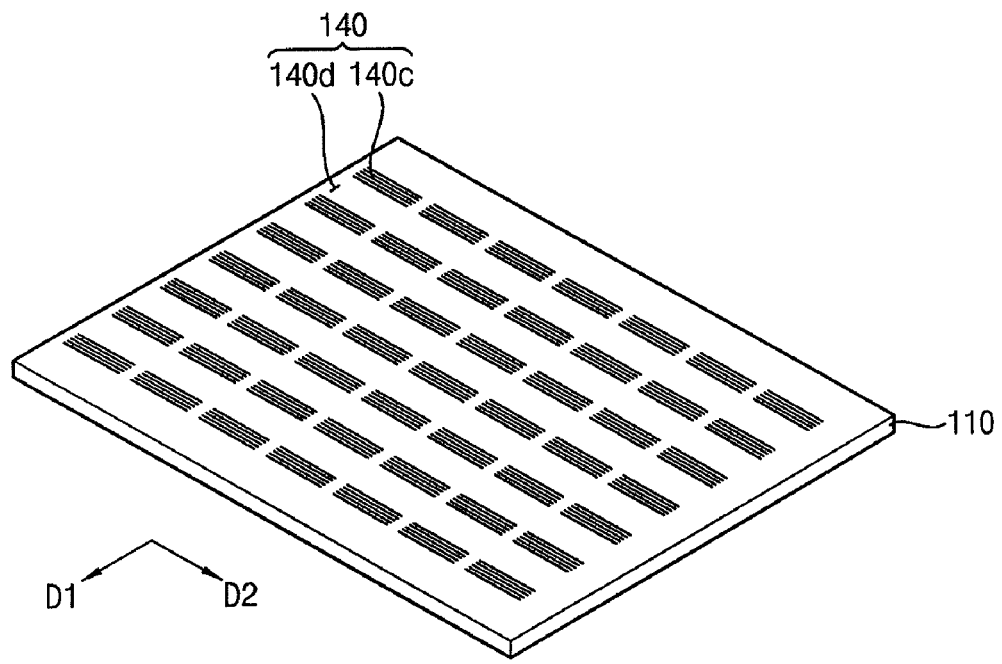
FIG. 8 is a perspective view showing a polarizing pattern according to an exemplary embodiment of the present invention.

FIG. 8 is a perspective view illustrating a first base substrate including a polarizing layer according to an exemplary embodiment of the present invention.

In the first base substrate 110 according to an exemplary embodiment, a third polarizing pattern 140c and a third non-polarizing pattern 140d are formed.

Referring to FIG. 8, the first polarizing layer 140 includes a third polarizing pattern 140c and a third non-polarizing pattern 140d.

A size of the third polarizing pattern 140c may be substantially the same as that of a pixel unit. The third polarizing pattern 140c may correspond to the pixel unit. A plurality of the third polarizing patterns 140c may be arranged in a first direction D1 and a second direction D2 different with the first direction D1. In an exemplary embodiment, the third polarizing patterns 140c may be arranged in the second direction D2 to define one polarizing pattern of the stripe type.

The third non-polarizing pattern 140d may be formed surrounding the edge of the third polarizing pattern 140c. The third non-polarizing pattern 140d may be formed on the region except for the region in which the third polarizing pattern 140c is formed.

Accordingly, the third polarizing pattern 140c may be formed only on the region in which the movement of liquid crystal is affected and which corresponds to the pixel unit of the first base substrate 110. Thus, an amount of the carbon nano-tubes CNT which are needed for forming the third polarizing pattern 140c may be minimized.

Figure 9:
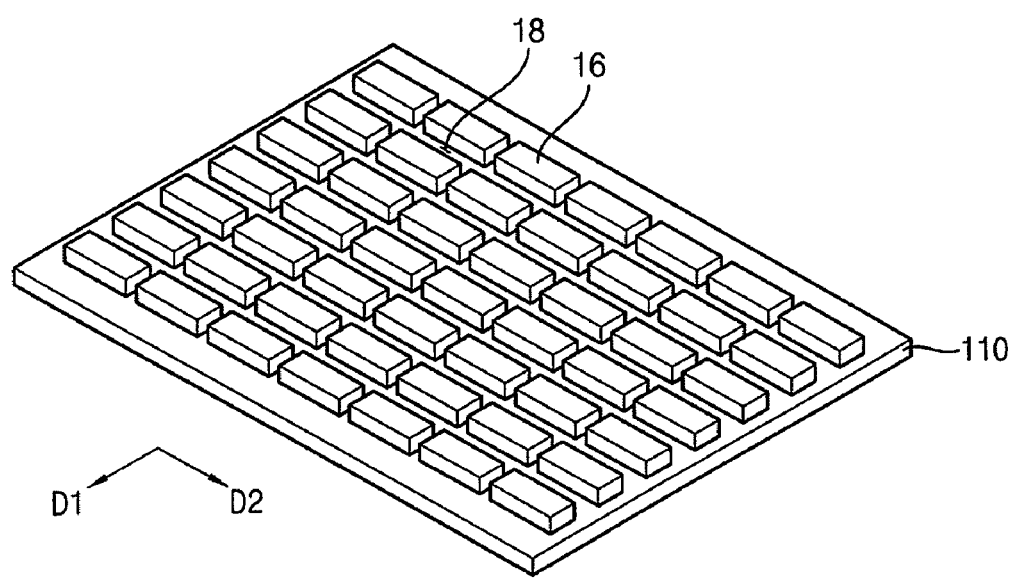
FIG. 9 is a perspective view illustrating a photo pattern used in forming a polarizing pattern according to an exemplary embodiment of the present invention.

FIG. 9 is a perspective view illustrating a photo pattern used in forming a polarizing pattern according to an exemplary embodiment of the present invention.

Referring to FIG. 9, a photo pattern 16 is formed on the first base substrate 110. The photo pattern 16 may cover a polarizing region of the first base substrate 110 and expose a non-polarizing region through an opening 18. The polarizing region may correspond to the pixel unit including a switching element and a pixel electrode.

Subsequent processes after forming the photo pattern 16 are substantially the same as the processes of forming the self assembled monolayer 20, the water layer 30, the first polarizing pattern 140a, and the first protective layer 150, except for the polarizing region and the non-polarizing region.

Referring to FIGS. 8 and 9, the third polarizing pattern 140c is formed on the first base substrate 110 of the first display substrate 100. In an exemplary embodiment, a fourth polarizing pattern, which is substantially the same as the third polarizing pattern 140c, may be formed on the second base substrate 210 using the photo pattern 16 to form a second polarizing layer including the fourth polarizing pattern.

Figure 10:
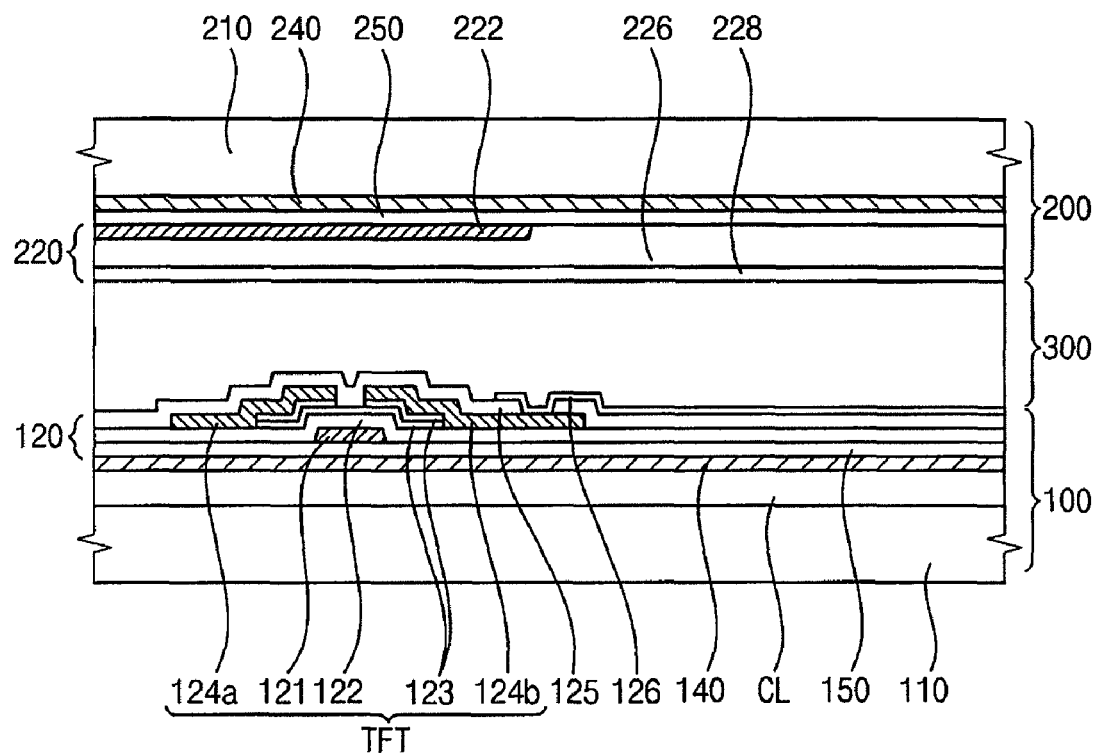
FIG. 10 is a cross-sectional view illustrating a display panel according to an exemplary embodiment of the present invention.

FIG. 10 is a cross-sectional view illustrating a display panel according to an exemplary embodiment of the present invention.

In a display panel 502 according to an exemplary embodiment, a color layer CL is formed on the first base substrate 110.

Referring to FIG. 10, the display panel 502 includes the first display substrate 100, the second display substrate 200, and the liquid crystal layer 300.

The first display substrate 100 includes the color layer CL, the first polarizing layer 140, the first protective layer 150 and the first pixel layer 120 which are formed on the first base substrate 110.

The color layer CL may be formed on the first base substrate 110. The color layer CL may contact a first surface of the first base substrate 110. The color layer CL may include a light-emitting body which absorbs light to display a color. Even when the light-emitting body receives polarizing light, the light-emitting body emits non-polarizing color light. Thus, the color layer CL may be formed under the first polarizing layer 140. The light-emitting body may include, for example, BaMgAl$_{10}$O$_{17}$:Eu, or ZnS, ZnCdS:AgCl.

Alternatively, the color layer CL may be formed via patterning a color photoresist layer. The color layer CL may be formed on the first surface or a second surface opposite to the first surface according to an exemplary embodiment. The color layer CL may be formed on the first polarizing layer 140 according to an exemplary embodiment.

The first polarizing layer 140 may be formed on the color layer CL. The first pixel layer 120 may be formed on the first polarizing layer 140. According to an exemplary embodiment, the first polarizing layer 140 and the first pixel layer 120 may be formed on the same surface.

The second display substrate 200 includes the second polarizing layer 240, the second protective layer 250, and the second pixel layer 220 which is formed on the second base substrate 210. The second protective layer 250 may be formed on the second polarizing layer 240. The second pixel layer 220 may be formed on the second protective layer 250.

The color layer CL is formed on the first base substrate 110, so that the color filter may be omitted and the second pixel layer 220 may include the light-blocking pattern 222, the over-coating layer 226, and the common electrode 228.

In FIG. 10, a polarizing pattern of the first polarizing layer 140 and a polarizing pattern of the second polarizing layer 240 are arranged in parallel. Alternatively, the polarizing patterns of the first and second polarizing layers 140 and 240 may be perpendicular to each other or form a predetermined acute angle with each other according to an exemplary embodiment of the present invention.

Figure 11:
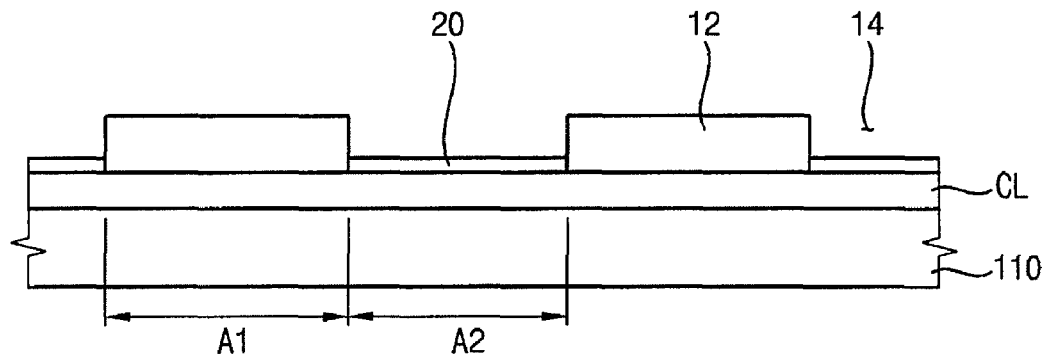
FIG. 11 is a cross-sectional view showing a color layer and a self assembled monolayer according to an exemplary embodiment of the present invention.

FIG. 11 is a cross-sectional view showing a color layer and a self assembled monolayer according to an exemplary embodiment of the present invention.

Referring to FIG. 11, the color layer CL is formed on the first base substrate 110.

A color photoresist layer may be formed on the first base substrate 110 and patterned via a photolithography process to form the color layer CL. Alternatively, the color layer CL may be formed via coating a solution which includes the light-emitting body.

Then, a photoresist layer may be formed on the first base substrate 110 including the color layer CL and patterned via the photolithography process to form the photo pattern 12.

The first base substrate 110 including the photo pattern 12 may be dipped into the solution including a silicon compound. The silicon compound may be combined with the first base substrate 110 of the non-polarizing region A2 to form the self assembled monolayer 20 on the non-polarizing region A2.

Subsequent processes after forming the self assembled monolayer 20 are substantially the same as forming the water layer 30, the first polarizing pattern 140 and the first protective layer 150 described in connection with FIGS. 1 through 6.

According to an exemplary embodiment of the present invention, the first polarizing layer 140 is directly formed on the first base substrate 110. As such, the thickness of the display panel 502 may be decreased. The first polarizing layer 140 is formed using the carbon nano-tubes CNT. Thus, the first polarizing layer 140 may be formed evenly with a consistent density throughout the contacting surface. Since blade-coating of the carbon nano-tubes CNT is performed, the first polarizing layer 140 may be formed on the first display substrate 100 in the large-sized or medium-sized display panel.

Accordingly, in the large-sized or medium-sized display device, the polarizing pattern may be formed using the carbon nano-tubes on the display substrate which has a wide area. Thus, the thickness of the large-sized or medium-sized display device may be decreased and the reliability in polarizing the light may be improved.

Although exemplary embodiments of the present invention have been described herein with reference to the accompanying drawings, it is to be understood that the present invention should not be limited thereto and that various other changes and modifications may be affected therein by one of ordinary skill in the related art without departing from the scope or spirit of the invention. All such changes and modifications are intended to be included within the scope of the invention.

What is claimed is:

1. A method for manufacturing a display substrate, the method comprising:
   forming a polarizing layer on a base substrate, the polarizing layer including a polarizing pattern comprising a plurality of carbon nano-tubes, wherein forming the polarizing layer comprises:
   forming a photoresist on the base substrate;
   patterning the photoresist to form a plurality of openings in the photoresist;
   forming a hydrophobic layer in the openings;
   removing the patterned photoresist layer;
   performing a hydrophilic treatment on portions of the base substrate adjacent portions of the base substrate on which the hydrophobic layer is formed; and
   forming a water layer on the base substrate, wherein the water layer flows away from the portions of the base substrate on which the hydrophobic layer is formed to the portions of the base substrate on which the hydrophilic treatment was performed; and
   forming a pixel layer having a plurality of pixel units on the base substrate.

2. The method of claim 1, wherein the polarizing layer is formed on a first surface of the base substrate, and the pixel layer is formed on a second surface of the base substrate, wherein the first surface is opposite to the second surface with respect to the base substrate.

3. The method of claim 1, wherein the pixel layer is formed on the polarizing layer.

4. The method of claim 1, wherein the hydrophobic layer comprises a self assembled monolayer and is formed in a non-polarizing region of the base substrate.

5. The method of claim 4, wherein the water layer is formed in a polarizing region of the base substrate.

6. The method of claim 5, wherein forming the polarizing layer further comprises forming the polarizing pattern comprising carbon nano-tubes on the water layer, and not on the self-assembled monolayer.

7. The method of claim 6, wherein the patterned photoresist exposes the non-polarizing region and covers the polarizing region.

8. The method of claim 6, wherein forming the water layer comprises blade-coating water on the base substrate.

9. The method of claim 8, wherein performing the hydrophilic treatment comprises treating a surface of the polarizing region using oxygen gas before forming the water layer.

10. The method of claim 8, wherein each surface of the carbon nano-tubes is hydrophilic.

11. The method of claim 8, wherein forming the polarizing layer further comprises providing an electric field or a magnetic field to the base substrate in a moving direction of a blade.

12. The method of claim 1, further comprising forming a protective layer on the base substrate, the protective layer covering the whole base substrate including the polarizing pattern.

* * * * *